(12) United States Patent
Burch et al.

(10) Patent No.: US 7,073,879 B2
(45) Date of Patent: Jul. 11, 2006

(54) METHODS AND APPARATUSES FOR CATEGORIZING PRINT MEDIA

(75) Inventors: Eric L. Burch, San Diego, CA (US); Jaime G. Jurrens, San Diego, CA (US); Dan M. Weeks, Poway, CA (US); Nils Miller, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 961 days.

(21) Appl. No.: 10/060,625

(22) Filed: Jan. 30, 2002

(65) Prior Publication Data
US 2003/0142326 A1     Jul. 31, 2003

(51) Int. Cl.
B41J 29/38      (2006.01)
B41J 2/01       (2006.01)

(52) U.S. Cl. .............................. 347/16; 347/14; 347/19

(58) Field of Classification Search ................... 347/16, 347/14, 19, 105, 106; 358/1.8, 1.9; 250/559.01; 369/53.2
See application file for complete search history.

(56) References Cited

U.S. PATENT DOCUMENTS 6,425,650 B1 *  7/2002  Walker et al. ................ 347/14
6,520,614 B1 *  2/2003  Kaneko ........................ 347/14
6,578,944 B1 *  6/2003  Kamei et al. ................. 347/16

* cited by examiner

Primary Examiner—Hai Pham
Assistant Examiner—Lam S Nguyen

(57) ABSTRACT

Methods and apparatuses are provided for use in printing devices. In certain implementations, ink is printed to a first area of a print medium and a second area of the print medium. The ink is applied to the first area at a higher density than the second area. A first light scattering intensity value is measured from the first area and a second light scattering intensity value is measured from the second area. The print medium is categorized based on a comparison of the light scattering intensity values.

27 Claims, 5 Drawing Sheets

METHODS AND APPARATUSES FOR CATEGORIZING PRINT MEDIA

BACKGROUND

There are a variety of different types of print media available for use in printing devices. By way of example, there is standard or plain paper print media, photographic quality paper print media, transparency print media, and the like. Many of these different types of print media act differently when liquid ink is applied on their surface. For example, some print media will absorb the liquid ink faster than other types of print media, some print media will be able to absorb more liquid ink than other types of print media, and/or some print media will allow the liquid ink to spread out more than will other types of print media.

With this in mind, many printing devices allow for different user selected print modes. The print modes may be associated with the type of data (e.g., text, graphics, image, etc.) to be printed, the desired quality of the print, and/or the type of print media being used. Some print modes may also take into consideration the type of ink(s) being used. Based on the user selections, the print modes will cause the printing device to follow a predefined "optimal" printing process that best suits the situation.

There is a continuing movement in the printing device community to make the printing devices smarter and more user friendly. As such, some printing devices include automated mechanisms designed to reduce the amount of information that the user is required to know and provide to the printing device and/or its associated software. By way of example, some printing devices include sensing mechanisms that measure light reflected from the blank surface of the print media. Such measurements can be used to characterize the print media as belonging to a certain category of print media. For example, the print media may be considered to be "photographic quality" paper if its surface reflects a lot of light. Accordingly, certain printing process parameters can then be set to achieve the desired image quality in the resulting print.

One of the problems with such automated techniques is that a few different types of print media may exhibit about the same light reflectance. Hence, the automated characterization of the print media may be incorrect or otherwise too broad in scope. Consequently, the resulting printing process may not be correct or optimal for the print media.

Thus, there is a need for methods and apparatuses that can be implemented in a printing device/printing environment to further determine additional print media information and make improved printing process decisions based on the additional print media information.

SUMMARY

The above stated needs and others are met, for example, by a method that includes selectively applying at least one ink to a first area of a print media and a second area of the print media. Here, the ink is applied to the first area at a higher density than the second area. The method further includes measuring a first light scattering intensity value associated with the first area and a second light scattering intensity value associated with the second area, categorizing the print media based on a comparison of the first light scattering intensity value and the second light scattering intensity value, and selectively setting at least one printing parameter based on the categorization of the print media.

In accordance with other implementations of the present invention, a method includes selectively applying at least one ink to an area of a print media, measuring a first light scattering intensity value associated with the area at a first time, and a second light scattering intensity value associated with the area at a second time subsequent to the first time, categorizing the print media based on a comparison of the first light scattering intensity value and the second light scattering intensity value, and selectively setting at least one printing parameter based on the categorization of the print media.

BRIEF DESCRIPTION OF THE DRAWINGS

A more complete understanding of the various methods and apparatuses of the present invention may be had by reference to the following detailed description when taken in conjunction with the accompanying drawings wherein.

DETAILED DESCRIPTION

Figure 1:
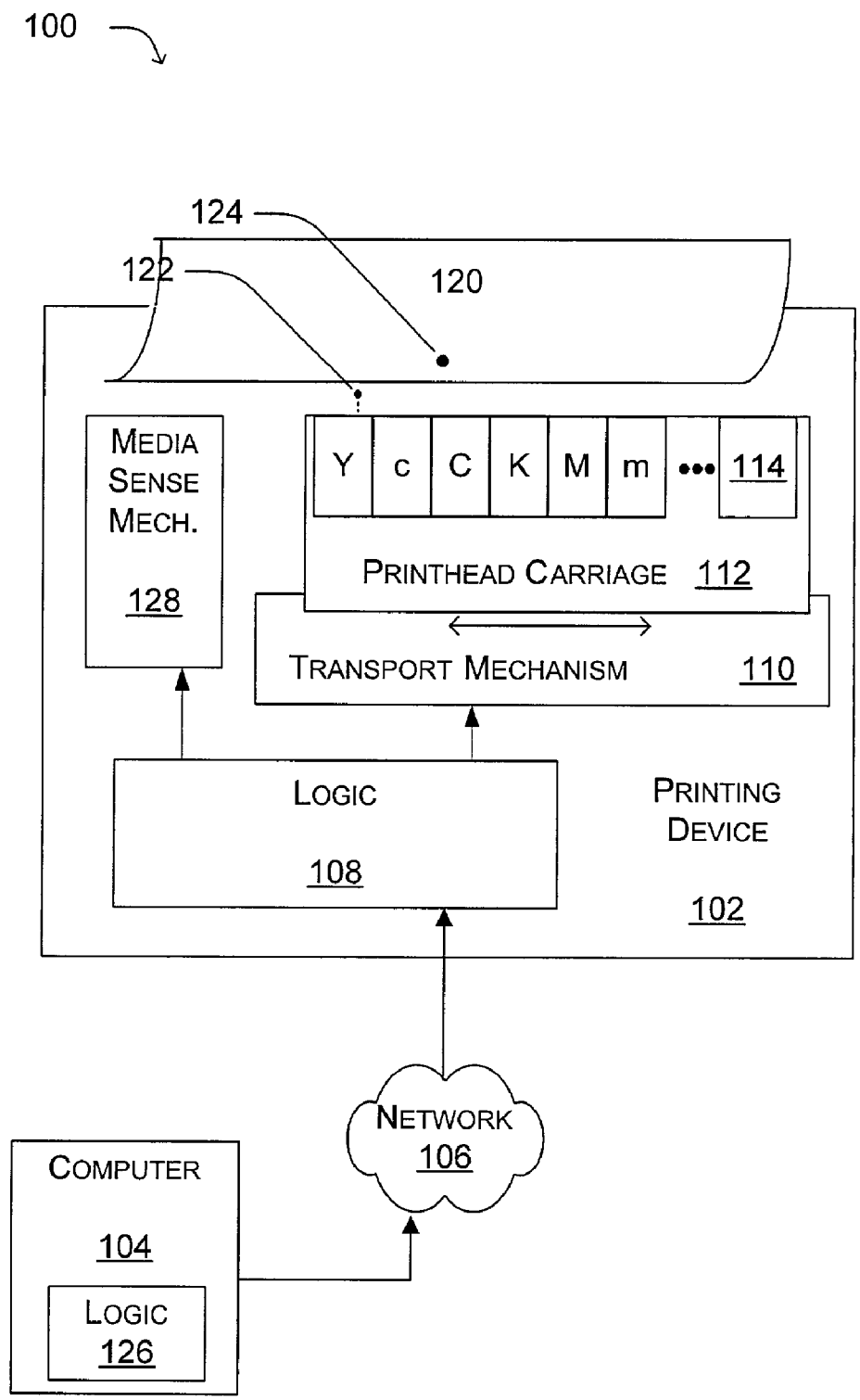
FIG. 1 is a block diagram depicting a printing environment having a representative printing device, in accordance with certain exemplary implementations of the present invention.

Generally, higher quality print media, such as, e.g., photographic-quality print media (photo media), that is available today can be categorized based on the type of ink-receiving layer (printable surface) it has. A first category includes "swellable" media, in which the print media is relatively slow at absorbing liquid ink. Swellable media usually includes an ink-receiving layer that swells when the liquid ink is applied to it. For example, some swellable media includes a polymer matrix based ink-receiving layer that essentially causes the print media to swell up, not unlike a disposable diaper. Such swellable media continues to swell as more liquid ink is applied to it. As the liquid part of the ink evaporates, the swelled up material de-swells or shrinks down resulting in a dry surface.

A second category of print media is "porous" media. Porous media absorbs liquid ink considerably faster than swellable media. Porous media typically includes an ink-receiving layer of material having openings or air spaces that can be filled by the liquid ink without causing significant swelling of the print media. When the liquid part of the ink evaporates a dry surface is again created, but now colored by the remaining ink particles.

Both swellable and porous print media present challenges during the printing process in order to avoid potential print quality defects. One of the challenges concerns the differing liquid ink absorption rates. To optimize the print image quality, there is a need to determine the proper ink application rate (e.g., volume of ink/unit time, number of ink drops/unit of time). This decision needs to consider the print media's ink-absorption capability. For swellable media, if the ink application rate is too high, then the print media may not swell fast enough to absorb all of the ink. Consequently, pools of liquid ink may form on the surface of the sellable media. These pools of ink will eventually dry and form areas that are darker than had been intended. One reason for this unwanted darkening, for example, is that a pool of ink can cause ink from the surrounding area to be drawn into it. As such, the area will be darker and the surrounding area will be lighter than had been intended. Such unwanted dark/light patterns are considered to be serious print quality defects.

As the ink application rate increases for a porous media, the absorption rate of the porous media tends to decrease proportionally, until, of course a saturation level is reached. If the porous media does not become saturated, then typically no significant print quality defects will occur. Indeed, one advantage of porous media is that ink can be applied at a higher rate than with swellable media. Consequently, the amount of time required to complete the printing process may be less than that associated with the swellable media.

Another possible print quality defect that can occur is associated with the ink holding capacity of the print media. For example, to make an area of the print darker, more ink will need to be applied to the area. For swellable media, as long as the application rate is not too high, more and more ink can be added to make an area darker. For porous media, there is a limit to how much liquid ink can be added, since at a saturation point the ink will form into pools. Hence, the volume of ink needs to be carefully controlled so as to not exceed the ink holding capacity of the porous media when forming certain dark areas.

Another possible print quality defect that can occur is associated with the color properties of the print media. For example, in certain situations colors printed on swellable media may appear different than the same colors printed on porous media. Hence, the color interpretation/mapping provided by the printing device may benefit from being adjusted based on the type of print media being used.

As illustrated in the above examples, swellable media and porous media each have certain benefits and drawbacks to be considered when printing to them. Thus, it would be beneficial to have methods and apparatuses that can identify/classify a print media as either being swellable or porous print media, such that the printing parameters/process can be adjusted to take these and/or other benefits/drawbacks into account.

One way to identify/classify swellable media from porous media is based on information provided by the print media manufacturer. For example, a user may selectively input a name of the print media, e.g., as supplied by the manufacturer, through dialog box or other like graphical user interface (GUI) input arrangement associated with an application, a print driver, and/or other like print related program/logic. Based on this user provided information, an appropriate printing process can be established. For example, adjustments may be made to the ink application rate, the volume of ink(s) to be applied, the timing for the application of the ink, and/or other like printing parameters that are based at least in part on the user provided information.

Drawbacks to this type of manual user input technique include, for example, requiring users to actually know/learn the name or other identifying information associated with the print media, requiring users to take the time to input such identifying information, and requiring corresponding logic to make adjustments to the printing process based on the user provided information.

A more automated way to identify/classify print media as being either swellable or porous involves using at least one media sensing mechanism that is arranged within the printing device and configured to discover information about the print media. Here, for example, an optical sensing mechanism may be provided and configured to measure reflected light from an area of the printable surface of the print media. In certain printing devices, for example, the optical sensing mechanism measures "light scattering intensity" associated with a blank print media by emitting light and measuring the amount of that light that is reflected back from the printable surface of the print media. By way of example, the light scattering intensity measurement may measure "gloss" scattering, "haze" scattering, and/or "diffuse light" scattering. Logic is then provided to characterize the print media based on the measured light scattering intensity measurement.

By way of example, in certain ink-jet printers, media sensing logic determines if the print media is either "plain paper," "coated paper," "photo media," or "transparency media". Here, for example, plain paper may include print media having a rough printable surface that exhibits a fairly low gloss scattering intensity measurement when measured; coated paper may include print media that has a somewhat less rough surface and exhibits a slightly higher gloss scattering intensity measurement when measured; photo media may include print media that has a somewhat smooth printable surface that exhibits a higher gloss scattering intensity measurement when measured; and, transparency media may include print media that has a mostly smooth printable surface that exhibits an even higher gloss scattering intensity measurement when measured.

Based on these four exemplary print media classifications, one or more printing parameters are then adjusted with the hope of producing the desired print quality. Photo media, however, does not always have the same type of printable surface. The photo media may, for example, be swellable media or porous media as described above. Current automated techniques cannot readily distinguish between these two types of media. In the above ink-jet printer, for example, upon determining that the print media falls into the photo media bucket based on the measured light scattering intensity measurement, the logic sets applicable printing parameters to account for the worst-case scenario of photo media. Thus, the logic may configure the printing process to provide a low ink application rate in case the photo media happens to be swellable media and a low ink volume in case the photo media happens to be porous media. This type of printing process configuration is not optimal for either swellable media or porous media, nor does it provide for an optimal use of the printing resource since, for example, the printing process may run slower than it actually has to.

Consequently, there is a need for improved methods and apparatuses that can characterize print media as being either "swellable" print media or "porous" print media. Further, such methods and apparatuses should be configurable to make corresponding adjustments to one or more printing process parameters based on whether the print media is characterized as being swellable or porous print media. Preferably, the methods and apparatuses will make such characterizations and parameter adjustments in a fairly automated manner.

This invention provides improved methods and arrangements that are able to classify print media as being either swellable media or porous media and adjust printing parameter(s)/modes based thereon.

FIG. 1 depicts an exemplary printing environment 100 that includes a printing device 102. Printing device 102 is representative of any device that is configured to selectively apply liquid ink to a print media 120. By way of example, printing device 102 may include a printer, a copier, a facsimile machine, or other like device.

In the illustrated example, printing device 102 takes the form of an inkjet printer, which is operatively coupled to a computer 104 through a network 106. Computer 104 is representative of any device capable of providing print and/or control data to printing device 102. Here, computer 104 includes (optional) logic 126 the function of which is described in greater detail in subsequent sections.

Network 106 is representative of any communication resource and/or link capable of carrying print and/or control data from computer 104 to printing device 102. Thus, by way of example, network 106 can represent a wired connection and/or a wireless connection.

Printing device 102 includes logic 108 that is configured to control the printing process. Logic 108 (and logic 126) may include hardware, firmware, and/or software. Logic 108, in this example, is configured to receive print data from computer 104 via network 106. Logic 108 then orchestrates the corresponding printing process.

For example, logic 108 directs a transport mechanism 110, which is configured to selectively move a printhead carriage 112 with respect to print media 120. Print media 120 is also configured to be selectively moved with respect to printhead carriage 112, for example, by a print media transport mechanism (not shown).

Printhead carriage 112 includes at least one printhead 114. In this example, a plurality of printheads is included in printhead carriage 112. Here, each printhead 114 provides a color ink, e.g., yellow (Y), light cyan (c), dark cyan (C), black (K), light magenta (m), and dark magenta (M) inks. Consequently, as depicted print device 102 is considered a six color printing device. This is a representative set of inks. In other implementations, there may be any number of inks. For example, a four color printing device may include yellow (Y), cyan (C), black (K), and magenta (M) inks. In accordance with certain aspects of the present invention, a printhead may also be configured to apply a non-marking liquid to the print medium instead on an ink. In still other implementations, a single printhead may be configured to provide a plurality of different inks.

Since this exemplary implementation is an ink-jet printer, printhead 114 provides a plurality of nozzles. The nozzles may be grouped as an array, preferably a logically linear array. Each nozzle is configured to selectively eject an ink drop 122, which causes a dot 124 to be printed on a printable surface of print media 120. During printing, for example, transport mechanism 110 moves print carriage 112 and ink drops 122 are selectively placed on print media 120 to form a color swath (not shown) comprised of a plurality of dots. One or more swaths may be applied to form a printed area on print media 120. The height of the swath is typically determined by the orientation of the linear nozzle array with respect to the transport direction of carriage 112.

Figure 2:
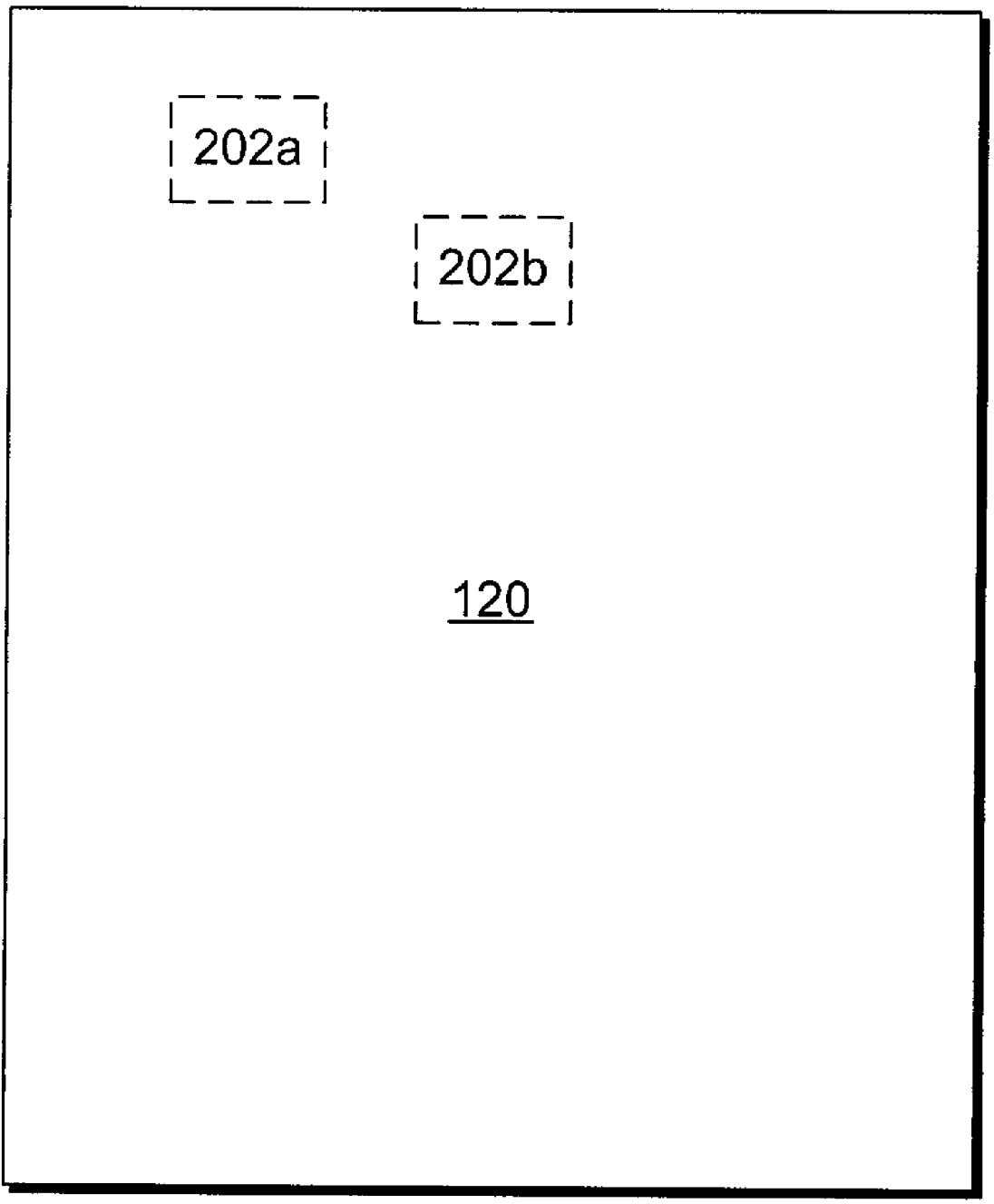
FIG. 2 is an illustrative representation of a print media having a plurality of diagnostic areas printed thereon, in accordance with certain exemplary implementations of the present invention.

As illustratively depicted in FIG. 2, in accordance with certain exemplary implementations of the present invention, at least two diagnostic areas 202a–b are printed on print media 120. Diagnostic print areas 202a–b may be formed by one or more swaths using one or more inks. In accordance with certain exemplary implementations, diagnostic areas 202a–b may be specially printed areas that are not part of the desired print. Thus, for example, diagnostic areas 202a–b may include small rectangles/squares that are located near a corner or an edge, possibly a removable edge, of print media 120. In accordance with other exemplary implementations, diagnostic areas 202a–b may be part of the desired print that is being formed.

A media sense mechanism 128 (FIG. 1) is then used to measure the light scattering properties of printed diagnostic areas 202a–b to produce a light scattering intensity measurement or like measurement for each of the diagnostic areas. Media sense mechanism 128 may provide, for example, a light emitting capability and a light detecting capability. The light detecting capability would be responsive to the portion of the emitted light that is reflected back from the diagnostic areas. This is simply one example of how the light scattering properties of diagnostic areas 202a–b may be measured. Those skilled in the art will recognize that other types of media sense mechanisms and other like sensing mechanisms may also be employed to perform this sensing or measuring operation.

Further, those skilled in the art will also recognize that media sense mechanism 128 may be operatively configured within printing device 102 in a variety of ways. For example, in certain implementations media sense mechanism 128 may be configured such that it is carried by transport mechanism 110 or other mechanism and thus able to measure diagnostic areas located in different locations on print media 120, while in other implementations media sense mechanism 128 may be held stationary and print media 120 positioned, as needed, to allow media sense mechanism to measure diagnostic areas 202a–b.

Here, as shown in FIG. 1, media sense mechanism 128 is operatively coupled to logic 108. Logic 108 can therefore be configured to control the operation of media sense mechanism 128. Based on the measured light scattering intensity measurements print media 120 can be categorized by logic 108 and/or logic 126 as being either swellable media or porous media.

The measurement of light scattering intensity measurements and resulting categorization of print media 120 can be based on detectable differences in the behavior of swellable media verses porous media. The behavior can be examined, for example, based on differences that appear as a function of ink density.

Thus, for example, differences that appear as a function of density can be detected shortly after printing different diagnostic areas 202a–b. Here, diagnostic area 202a is printed with a "high density" of the ink, while diagnostic area 202b is printed with a correspondingly "low density" of ink. Media sense mechanism 128 is then used to measure the light scattering intensity measurement of these two differently printed diagnostic areas.

For swellable media it has been found that low density diagnostic area 202b will have higher measured light scattering intensity measurement than high density diagnostic area 202a. Thus, by comparing the relative difference between the measured gloss scattering intensity measurements for low density diagnostic area 202b and high density diagnostic area 202a, one may characterize print media 120 as being swellable media.

Conversely, for porous media it has been found that low density diagnostic area 202b and the high density diagnostic area 202a have about the same measured light scattering intensity measurement. For some types of porous media, the measured gloss scattering intensity measurement of low density diagnostic area 202*b* was slightly lower than the measured gloss scattering intensity measurement of high density diagnostic area 202*a*. Nevertheless, by comparing the relative difference between the measured light scattering intensity measurements for low density diagnostic area 202*b* and high density diagnostic area 202*a*, logic 108 and/or 126 can characterize print media 120 as being porous media.

Thus, in accordance with certain implementations of the present invention, if the difference between the measured light scattering intensity measurements of diagnostic areas 202*a* and 202*b* exceeds a defined threshold value then print media 120 is determined, e.g., by logic 108 and/or 126, to be swellable media. Likewise, if the difference between the measured light scattering intensity measurements of diagnostic areas 202*a* and 202*b* does not exceed a defined threshold value then print media 120 is determined to be porous media.

Based on the above additional categorization of the print media, a suitable or "optimal" print mode and/or printing process may be conducted, wherein certain imaging parameters are set.

Figure 3:
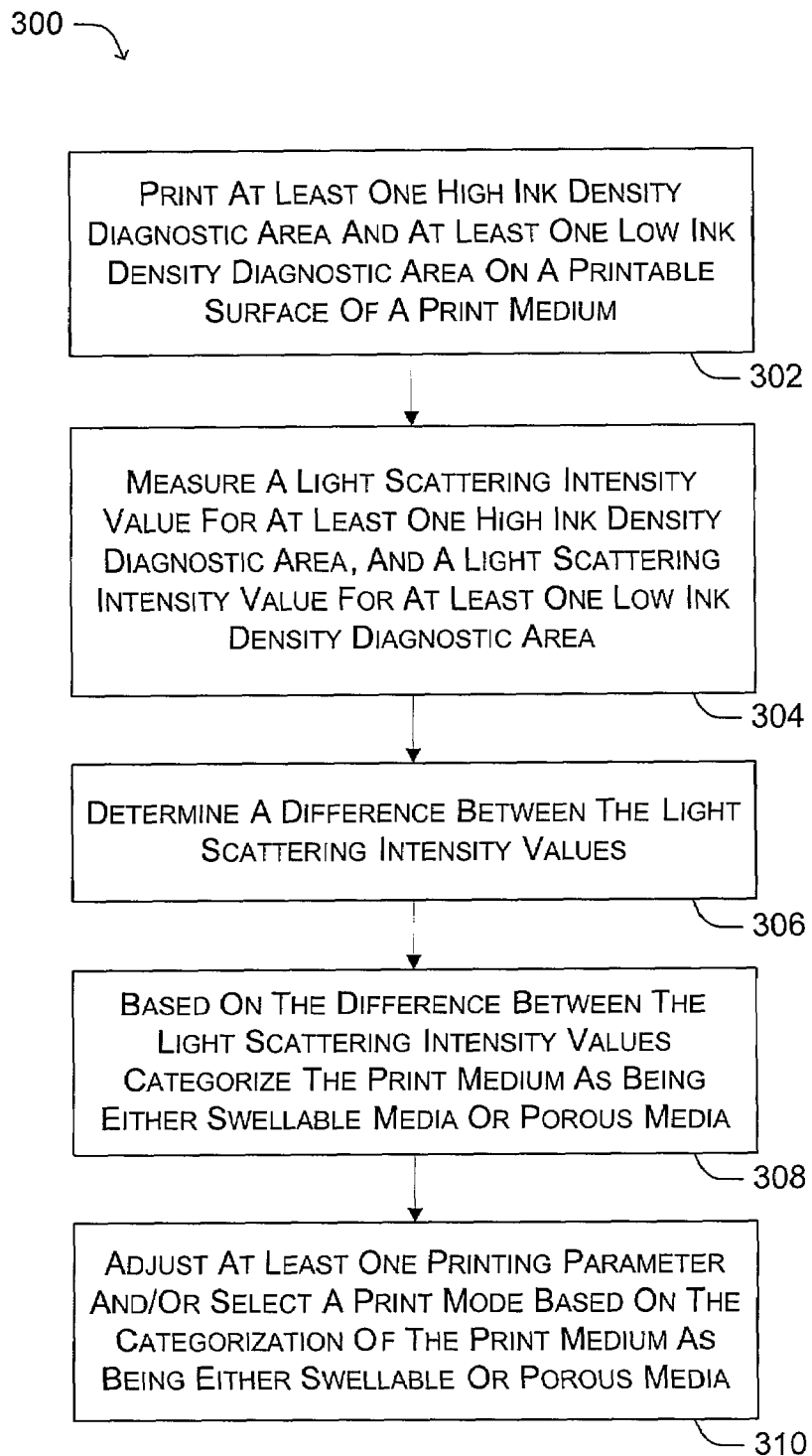
FIG. 3 is flow diagram depicting an exemplary process for categorizing print media using two or more printed areas, in accordance with certain exemplary implementations of the present invention.

With this in mind, attention is now drawn to FIG. 3, which is a flow diagram depicting an exemplary process 300 for categorizing print media 120 and adjusting imaging parameters and/or print modes based on the category of print media.

In step 302, at least one high ink density diagnostic area 202*a* and at least one low ink density diagnostic area 202*b* are printed on a printable surface of print media 120. Next, in step 304, a light scattering intensity value for at least one high ink density diagnostic area 202*a* and a light scattering intensity value for at least one low ink density diagnostic area 202*b* are measured, for example, using media sense mechanism 128. A difference between the measured light scattering intensity values is then determined in step 306. Then, in step 308, based on the difference between the measured light scattering intensity values, print media 120 is categorized or otherwise determined to be either swellable or porous media. In step 310, at least one printing parameter is adjusted and/or print mode selected based on the categorization of print media 120 as being either swellable or porous media.

Exemplary parameters that might be adjusted or otherwise made part of a defined print mode include: the amount of ink to be applied, the ink application rate, the printing speed, the number of passes used to apply the ink, the ordering of the application of the ink, the color map/table that is used to build up the print, and/or the like.

A print mode is a combination of a various print operational parameters that may be selected for a given printing operation. For example, a print mode may define that number of passes that are required to print to a particular area of a print medium, the amount by which the printhead and/or print medium are to be advanced, whether printing is unidirectional or bi-directional, the color map to use, and/or a print mask or shingle mask to use. In accordance with certain aspects of the present invention, experiments were conducted wherein a plurality of diagnostic areas were printed on commercially available "swellable" print media and "porous" print media using an ink-jet printer. As part of the experiments, a plurality of diagnostic areas measuring ¾ inch×1 inch and smaller were printed on the print media samples using one or more inks.

In certain experiments, the measured light scattering intensity values were compared versus ink density. Four diagnostic areas were printed using composite black (e.g., a C, M, and Y ink combination). The first diagnostic area was printed at 5% ink density, the second diagnostic area was printed at 10% ink density, the third diagnostic area was printed at 15% ink density, and the fourth diagnostic area was printed at 20% ink density. The light scattering intensity measurement was then measured for each of the diagnostic areas. As described in the exemplary implementations above, for swellable media it was found that the measured gloss scattering intensity measurement decreased with ink density. However, for porous media is was found that the measured gloss scattering density was either about the same for each density or increased slightly with ink density. Thus, it is possible to distinguish swellable media from porous media based on differences in the measured light scattering intensity measurement for two or more printed areas having different ink densities.

Figure 4:
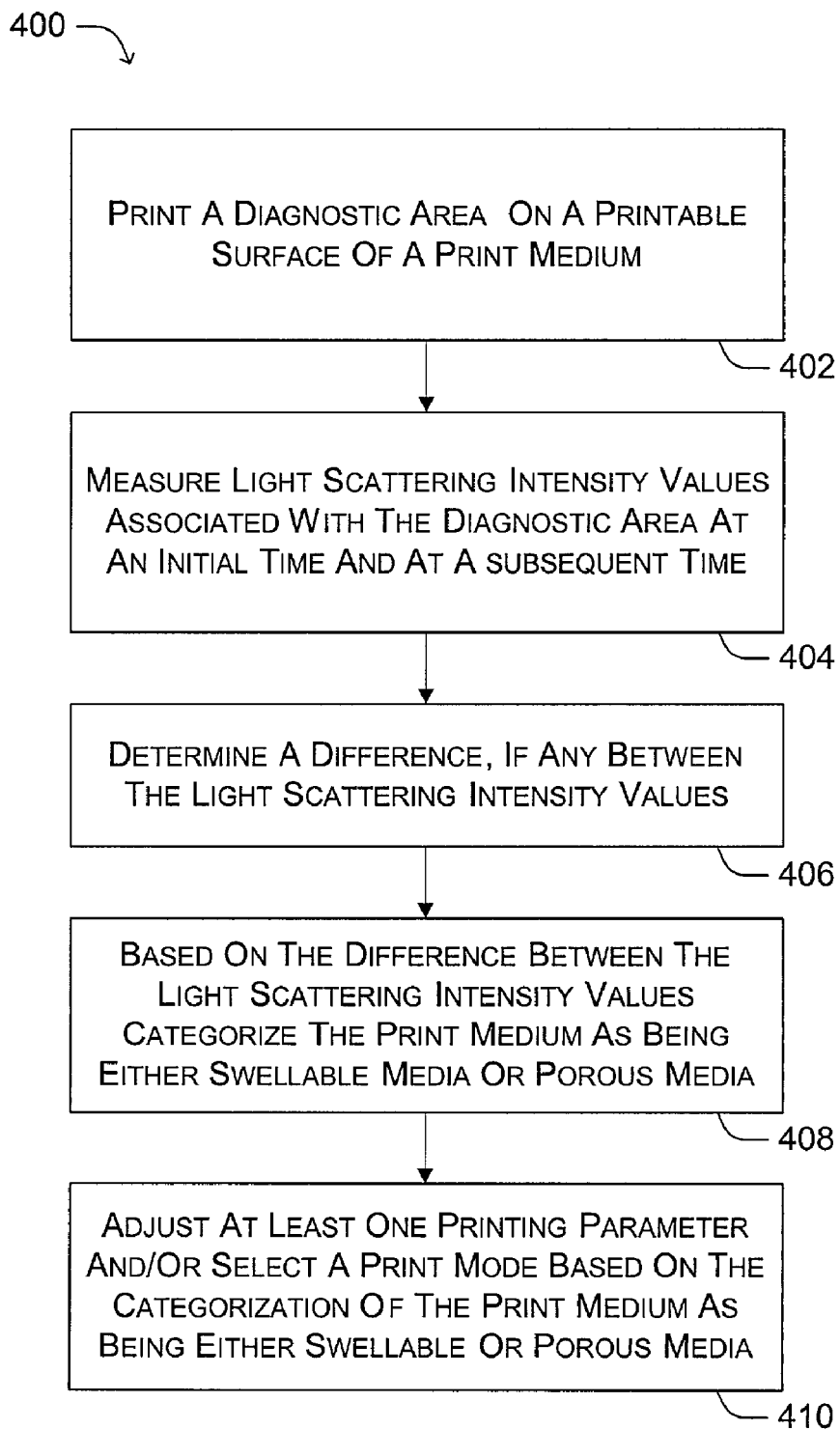
FIG. 4 is flow diagram depicting an exemplary process for categorizing print media using one or more printed areas, in accordance with certain other exemplary implementations of the present invention.

In other experiments, measured light scattering intensity values were compared verses the amount of time since printing. Generally, it was found that light scattering intensity measurement tended to significantly change with time (greater than about 5 seconds) for swellable media but not for porous media. Therefore, it is also possible to distinguish swellable media from porous media based on differences in the measured light scattering intensity measurement over an extended period of time. An exemplary process 400 for doing so is depicted in FIG. 4.

In step 402, at least one diagnostic area (e.g., 202*a*) is printed on a printable surface of print media 120. In step 404, light scattering intensity values associated with the diagnostic area are measured at an initial time and then again at a subsequent time, for example, using media sense mechanism 128. A difference between the measured light scattering intensity values is then determined in step 406. Then, in step 408, based on the difference between the measured light scattering intensity values, print media 120 is categorized or otherwise determined to be either swellable or porous media. In step 410, at least one printing parameter is adjusted and/or print mode selected based on the categorization of print media 120 as being either swellable or porous media.

Various inks and ink combinations were tested. In certain implementations, it was found that yellow (Y) ink might be used to print small diagnostic area(s) so as to reduce the visual impact. Moreover, in certain implementations, clear ink or other liquid can used to print one or more diagnostic areas.

Exemplary parameters that might be adjusted or otherwise made part of a defined print mode include: the amount of ink to be applied, the ink application rate, the printing speed, the number of passes used to apply the ink, the ordering of the application of the ink, the color map/table that is used to build up the print, and/or the like.

Figure 5:
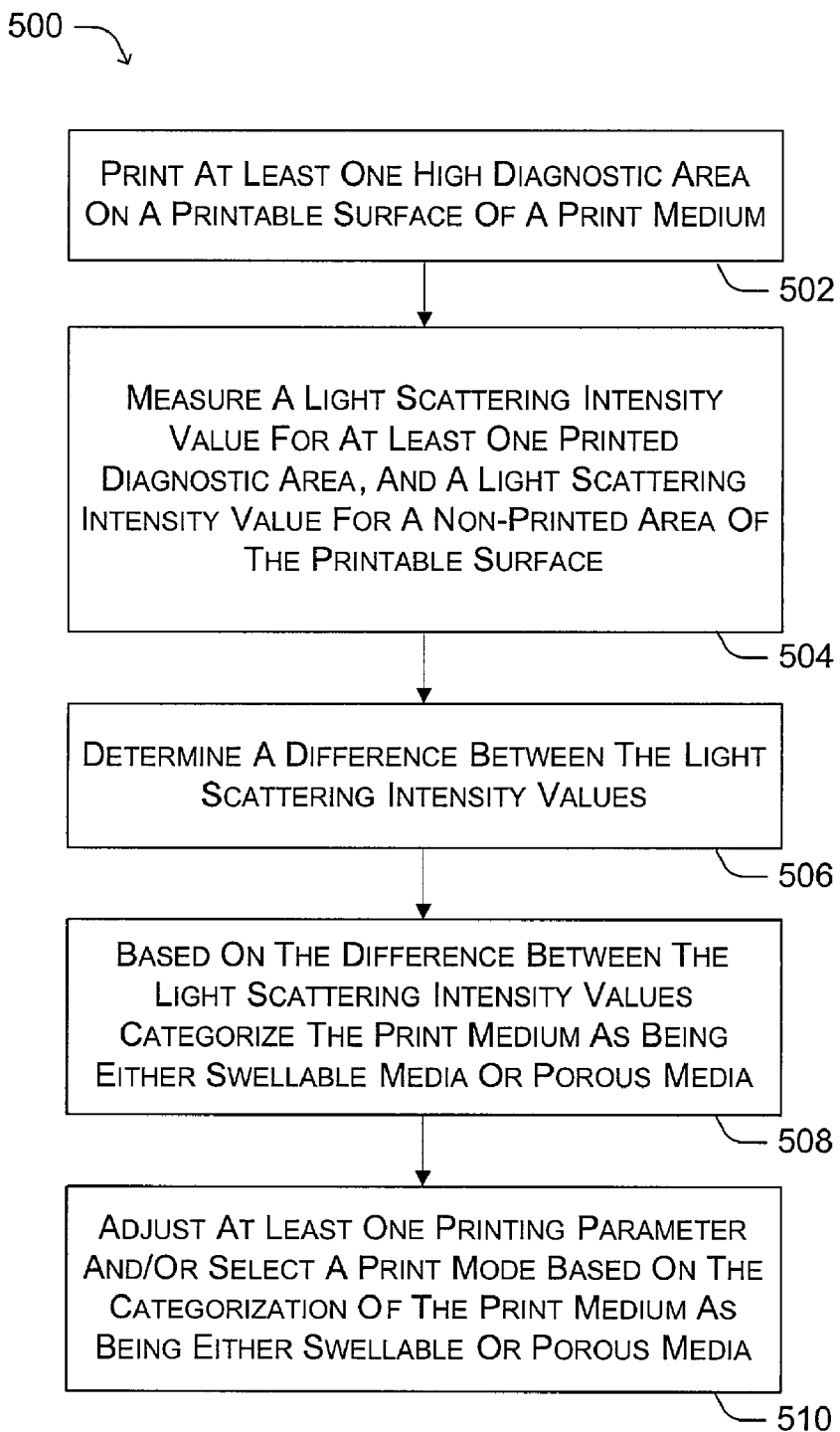
FIG. 5 is flow diagram depicting an exemplary process for categorizing print media using one or more printed areas, in accordance with certain further exemplary implementations of the present invention.

Attention is now drawn to FIG. 5, which is a flow diagram depicting an exemplary process 500 for categorizing print media 120 and adjusting imaging parameters and/or print modes based on the category of print media.

In step 502, at least one diagnostic area 202*a* is printed with at least one ink. Next, in step 504, a light scattering intensity value for diagnostic area 202*a* and a light scattering intensity value for a non-printed area are measured, for example, using media sense mechanism 128. A difference between the measured light scattering intensity values is then determined in step 506. Then, in step 508, based on the difference between the measured light scattering intensity values, print media 120 is categorized or otherwise determined to be either swellable or porous media. For example, the print media can be categorized as swellable media if the first light scattering intensity value for diagnostic area 202*a* is lower than the light scattering intensity value for the non-printed area by at least a defined threshold value. Conversely, the print media can be categorized as porous media if the first light scattering intensity value for diagnostic area 202a value is within a defined threshold value of the light scattering intensity value for the non-printed area.

In step 510, at least one printing parameter is adjusted and/or print mode selected based on the categorization of print media 120 as being either swellable or porous media.

Exemplary parameters that might be adjusted or otherwise made part of a defined print mode include: the amount of ink to be applied, the ink application rate, the printing speed, the number of passes used to apply the ink, the ordering of the application of the ink, the color map/table that is used to build up the print, and/or the like. In accordance with certain implementations of the present invention, the printed diagnostic area(s) may also be part of the intended print or printed image. Thus, for example, at least a portion of a swath of printed ink that is part of the image being printed may also be used in accordance with the above methods and apparatuses.

In still other implementations of the present invention, the diagnostic area(s) may be printed using a non-marking liquid as the ink. Here, the non-marking liquid will not substantially alter the appearance of the print medium once it has dried/evaporated. However, while wet the area having the non-marking liquid will appear similar to an area printed with an ink when the light scattering intensity for the wetted area is measured.

Thus, although some preferred embodiments of the various methods and apparatuses of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A method of printing with an ink jet printer, the method comprising:
   selectively applying at least one ink to a first area and a second area of a print medium, wherein said at least one ink is applied to said first area at a higher density than said second area;
   measuring a first light scattering intensity value associated with said first area and a second light scattering intensity value associated with said second area; and
   categorizing said print medium based on a comparison of said first light scattering intensity value and said second light scattering intensity value.

2. The method as recited in claim 1, further comprising:
   selectively setting at least one printing parameter based on said categorization of said print medium.

3. The method as recited in claim 2, wherein selectively setting said at least one printing parameter based on said categorization of said print medium further includes setting a print mode based on said categorization of said print medium.

4. The method as recited in claim 1, wherein categorizing said print medium based on said comparison further includes:
   categorizing said print medium as swellable media if said first light scattering intensity value is different than said second light scattering intensity value by at least a defined threshold value.

5. The method as recited in claim 1, wherein categorizing said print media based on said comparison further includes:
   categorizing said print medium as porous media if said first light scattering intensity value is within a defined threshold value of said second light scattering intensity value.

6. The method as recited in claim 1, wherein said first light scattering intensity value includes a first gloss scattering intensity value and said second light scattering intensity value includes a second gloss scattering intensity value, and categorizing said print medium based on said comparison further includes:
   categorizing said print medium as porous media if said second gloss scattering intensity value is greater than said first gloss scattering intensity value by at least a defined threshold value.

7. The method as recited in claim 1, wherein said first light scattering intensity value includes a first haze scattering intensity value and said second light scattering intensity value includes a second haze scattering intensity value, and categorizing said print media based on said comparison further includes:
   categorizing said print medium as porous media if said second haze scattering intensity value is less than said first haze scattering intensity value by at least a defined threshold value.

8. The method as recited in claim 1, wherein said first light scattering intensity value includes a first diffuse light scattering intensity value and said second light scattering intensity value includes a second diffuse light scattering intensity value, and categorizing said print media based on said comparison further includes:
   categorizing said print medium as porous media if said second diffuse light scattering intensity value is less than said first diffuse light scattering intensity value by at least a defined threshold value.

9. The method as recited in claim 1, wherein measuring said first light scattering intensity value associated with said first area and said second light scattering intensity value associated with said second area further includes measuring light scattered by said first and second areas.

10. The method as recited in claim 1, wherein at least one of said first and second areas is applied as a diagnostic area.

11. The method as recited in claim 1, wherein at least one of said first and second areas is applied as part of a printed file.

12. The method as recited in claim 1, wherein said at least one ink includes a non-marking liquid.

13. An apparatus comprising:
   a printing mechanism configurable to selectively apply at least one ink to a first area of a print medium and a second area of said print medium, in a manner such that said at least one ink is applied to said first area at a higher density than said second area;
   a sense mechanism configurable to measure a first light scattering intensity value associated with said first area and a second light scattering intensity value associated with said second area; and
   logic operatively coupled to said printing mechanism and said sense mechanism and configured to categorize said print medium based on a comparison of said first light scattering intensity value and said second light scattering intensity value, and based on said comparison selectively set at least one printing parameter.

14. The apparatus as recited in claim 13, wherein said logic is configured to categorize said print medium as swellable media if said first light scattering intensity value is different than said second light scattering intensity value by at least a defined threshold value.

15. The apparatus as recited in claim 13, wherein said logic is configured to categorize said print medium as porous media if said first light scattering intensity value is within a defined threshold value of said second light scattering intensity value.

16. The apparatus as recited in claim 13, wherein said first light scattering intensity value includes a first gloss scattering intensity value and said second light scattering intensity value includes a second gloss scattering intensity value, and said logic is configured to categorize said print medium as porous media if said second gloss scattering intensity value is greater than said first gloss scattering intensity value by at least a defined threshold value.

17. The apparatus as recited in claim 13, wherein said first light scattering intensity measurement includes a first haze scattering intensity measurement and said second light scattering intensity measurement includes a second haze scattering intensity measurement, and said logic is configured to categorize said print medium as porous media if said second haze scattering intensity value is less than said first haze scattering intensity value by at least a defined threshold value.

18. The apparatus as recited in claim 13, wherein said first light scattering intensity value includes a first diffuse light scattering intensity value and said second light scattering intensity value includes a second diffuse light scattering intensity value, and said logic is configured to categorize said print medium as porous media if said second diffuse light scattering intensity value is less than said first diffuse light scattering intensity value by at least a defined threshold value.

19. The apparatus as recited in claim 13, wherein said sense mechanism is configured to measure light scattered by said first and second areas.

20. The apparatus as recited in claim 13, wherein said printing mechanism is configurable to apply at least one of said first and second areas as a diagnostic area.

21. The apparatus as recited in claim 13, wherein said printing mechanism is configurable to apply at least one of said first and second areas as part of a printed file.

22. The apparatus as recited in claim 13, wherein said logic is configured to set a print mode based on said categorization of said print medium.

23. The apparatus as recited in claim 13, wherein said at least one ink includes a non-marking liquid.

24. An apparatus comprising:

means for selectively applying at least one ink to a first area of a print medium and a second area of said print medium, in a manner such that said at least one ink is applied to said first area at a higher density than said second area;

means for measuring a first light scattering intensity value associated with said first area and a second light scattering intensity value associated with said second area; and means for categorizing said print medium based on a comparison of said first light scattering intensity value and said second light scattering intensity value.

25. The apparatus as recited in claim 24, further comprising, means for selectively setting at least one printing parameter based on said comparison.

26. A computer readable medium having computer implementable instructions comprising steps for:

selectively printing at least one ink to a first area and a second area of a print medium, wherein said at least one ink is applied to said first area at a higher density than said second area;

determining a first light scattering intensity value associated with said first area and a second light scattering intensity value associated with said second area; and categorizing said print medium based on a comparison of said first light scattering intensity value and said second light scattering intensity value.

27. The computer readable medium as recited in claim 26, further comprising steps for:

selectively establishing at least one printing parameter based on said categorization of said print medium.

* * * * *